Patented May 22, 1951

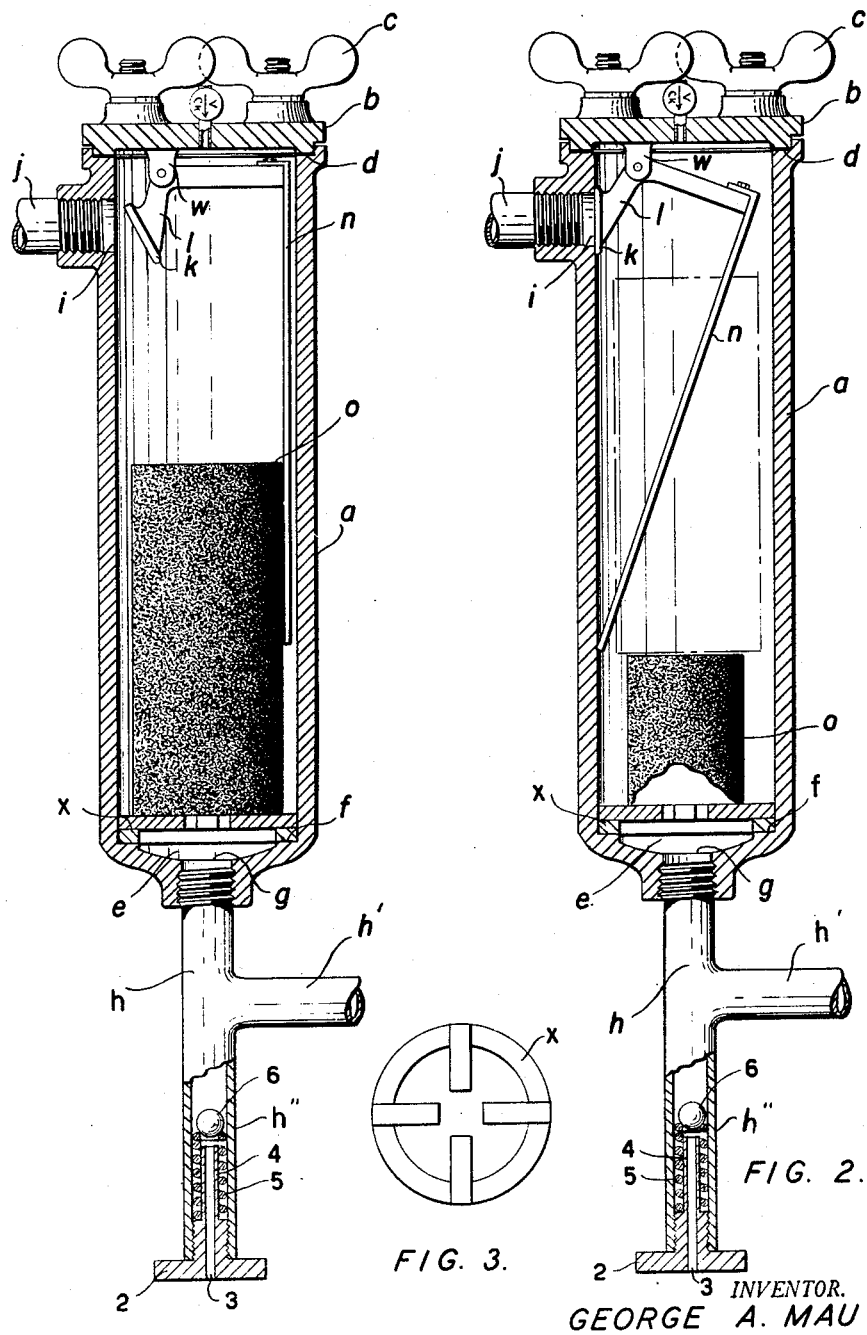

2,553,977

UNITED STATES PATENT OFFICE 2,553,977

PROPORTIONING DEVICE

George A. Mau, Lakewood, Ohio, assignor to The Johnson-March Corporation, New York, N. Y., a corporation of Delaware Application February 12, 1948, Serial No. 7,983

7 Claims. (Cl. 299—83)

This invention relates to a proportioning device and more particularly to such a device adapted for the addition of a water-soluble material to water in flow at a uniform rate, as, for example, the addition of a water-soluble wetting agent to water in flow at a uniform rate to lower its surface tension.

Heretofore the addition of a water-soluble material to water in flow, where addition of the soluble material is desired to be at a uniform rate, has presented a problem. Where the soluble material is in liquid form, substantially uniform addition thereof to water in flow has only been obtained through the medium of expensive and delicate metering devices. Where the soluble material is in solid form, no satisfactory means for its uniform addition to water in flow has heretofore been developed, it having been customary heretofore to add soluble material in such form in bulk to a given quantity of water contained in, for example, a tank.

Now in accordance with this invention, means are provided whereby a water-soluble material or composition in solid or solidified form may be readily and accurately added to water in flow in desired proportion and at a uniform rate.

More particularly, and by way of example, through the medium of the means provided by this invention, a water-soluble wetting agent in solid or solidified form may be added to a stream of water at a uniform rate and in desired proportion to produce a delivered stream having uniform lowered surface tension.

From the more specific standpoint the device according to this invention is so constructed as to be readily charged with water-soluble material for addition to a stream of water and to automatically shut off the flow of water when the soluble material is depleted to a point of non-uniform addition to the stream.

Having now indicated, in a general way, the nature and purpose of this invention, I will proceed, by way of illustration, to a detailed description of a preferred embodiment thereof with reference to the accompanying drawing, in which:

Figure 1 is a vertical sectional view of a proportioning device embodying this invention with the parts in operative position for the addition of a soluble material to a stream of water.

Figure 2 is a view similar to Figure 1 with the parts in inoperative position.

Figure 3 is a plan view of an element of the device of Figure 1.

The device illustrated by Figures 1 and 2 comprises a cylindrical casing $a$ having its upper end open and adapted to be closed by means of a cover $b$ secured to the casing by wing nuts $c$, a gasket $d$ being positioned between the cover and the casing to prevent leakage.

The lower end of the casing $a$ is internally dished or made concave, as shown at $e$ and a seat $f$ is formed adjacent the wall of the casing concentric with the concave bottom portion $e$ of the casing. A spider $x$ rests upon the seat $f$, it being appreciated that the seat $f$ may be formed as a spider.

Centrally of the concave bottom portion $e$ of the casing is an inlet opening $g$ to which is connected a T fitting $h$, one arm $h'$ of which is connected to a source of water under pressure controlled by any suitable valve (not shown), and the other arm $h''$ of which is closed by a plug 2, having a central bore 3 opening into the arm $h''$ of the T. Extending from the plug within the arm $h''$ is a spring guide 4, having a central bore in line with the bore 3 in the plug, about which is a spring 5 normally extending beyond the end of the guide and supporting a ball check valve 6 normally supported away from the end of the guide, so that the casing will drain when water is shut off from the casing, but adapted to seat on the end of the guide against the spring 5 when water under pressure is admitted to the T.

A laterally extending outlet opening $i$ is formed in the wall of the casing adjacent its upper end and to which a pipe $j$ for the delivery of water under pressure is connected.

The outlet opening $i$ is formed to provide a seat for a valve $k$ carried on an arm of a lever $l$, fulcrumed on a bracket $m$ depending from the cover $b$, and the other arm of which is connected to an end of a rod $n$, which extends downwardly in the casing $a$.

It will be noted that the lever $l$ is out of balance under the weight of the rod $n$, so that the valve $k$ will normally assume its closed position.

The casing $a$ is adapted to contain a cylindrical stick of water-soluble material $o$, which acts to hold the valve $k$ open by engagement with rod $n$, as shown in Figure 1, until the stick has been dissolved to a length to release the rod $n$, as shown in Figure 2.

The casing $a$, the cover $b$ and other parts may be made of any suitable material. Thus, with consideration for the corrosive action of the soluble material used, the casing and cover may be cast or molded from iron, steel, copper, aluminum, ferrous alloys, non-ferrous alloys, plastic, or the like. The valve $k$, lever $l$ and rod $n$ may desirably be formed from brass, though variously other material, as desired, may be used.

In the device above described there will be a relationship between the interior diameter of the casing $a$ and the initial diameter of the stick $o$, that is to say, the initial annular space between the stick $o$ and the casing will be at least large enough so that flow through the casing will be such that a full stream will leave the outlet $j$. Again, the size of the outlet $i$ will be proportioned to the size of the inlet $g$ so that there will be no back pressure within the casing, but rather a flow through the annular space between the stick $o$ and the wall of the casing at uniform pressure. The inlet $g$ will be substantially smaller in diameter than the diameter of the stick $o$, and when the stick $o$ has become concave, as shown in Figure 2, after initial dissolution, will be at a fixed distance below the stick.

As illustrative, the inside diameter of the casing will be in proportion to the diameter of the stick as 4 is to 3.5 to 3.0 and the inlet opening may vary from 0.5–1.0 inch for an outlet opening of .75 inch, using water pressure of 30–100 pounds.

In operation of the device, it is placed in a vertical position so that the stick $o$ will remain in contact with the spider $x$, or if desired, that it be placed out of the vertical, a spring will be provided to maintain the stick in contact with the spider. Initially a stick $o$ of water-soluble material, formed, for example, of borax, soap, or other water-soluble material capable of being molded or formed in solid cylindrical shape, is placed within the casing $a$ and the cover $b$ secured in place. The insertion of stick $o$ will effect opening of the valve $k$ through engagement with rod $n$, as shown in Figure 1. Water under pressure is then admitted to the casing through pipe $h$ and discharged therefrom through pipe $j$ for delivery to a point of use, through, for example, a spray nozzle.

The water entering the chamber will pass through the spider $x$ and impinge centrally on the circular bottom of the stick $o$ and pass upwardly about the stick through the annular space formed between the stick and the wall of the casing.

The stick $o$ will not be lifted in the casing by the water but rather will remain supported by the spider $x$ due to its weight and the balance of pressure within the casing. However, the maximum solubilizing effect of the water will be upon the bottom of the stick as compared with upon its surface in vertical extension due to the impingement of the water against the end of the stick.

As a result the stick will be dissolved in the main vertically as compared with diametrically, the water acting to form a cavity in the end of the stick, which remains of substantially constant size as the stick dissolves and affords a substantially constant sized surface of dissolution at a substantially fixed distance from the inlet $g$, as shown by a comparison of Figures 1 and 2. Thus, a substantially uniform addition of the soluble material of the stick to the water, at a rate, or in proportion, determined by the composition of the stick and the rate of flow of the water, until the length of the stick has been reduced to a point at which it will release the rod $n$ to the valve $k$ shutting off the flow of water and indicating the necessity for charging a new stick in the casing.

A new stick $o$ will be charged in the casing to rest on the portion of the previous stick remaining in the casing resulting in opening of the valve $k$ for continued use of the device.

When the device is not in use drainage of the casing $a$ and hence waste of the stick $o$ will be automatically effected through ball check 6, which will open on shutting off of the water supply to the casing. The check valve shown in the cover $b$, which will be closed by the pressure within the casing $a$ when the water is flowing therethrough, will open when the water supply to the casing is shut off and permit the entry of air to facilitate drainage.

As will, it is believed, be apparent, the proportioning device according to this invention will find various use where a soluble material is desired to be added to water in flow as, for example, in cleaning operations, with a stream or spray of water, in water spraying coal mines to lay dust, and the like.

What I claim and desire to protect by Letters Patent is:

1. A proportioning device for the addition of a water-soluble material to water in flow comprising a casing adapted to receive a stick of water-soluble material, a water inlet opening positioned substantially centrally of the bottom of said casing, means within said casing for supporting a stick of water-soluble material above said inlet in a position such that the flow of incoming water will impinge upon the lower end of the stick, a water outlet opening in the upper portion of said casing, and control means mounted within said casing, said control means including a valve member for controlling flow through said outlet and means extending downwardly in said casing and adapted to engage a stick of water-soluble material within said casing, said downwardly extending means when in engagement with a relatively unused stick of water-soluble material acting to hold said valve member in an open position and acting to close said valve when said stick of water-soluble material has been substantially dissolved.

2. A proportioning device for the addition of a water-soluble material to water in flow comprising a casing adapted to receive a stick of water-soluble material, a water inlet opening positioned substantially centrally of the bottom of said casing, means within said casing for supporting a stick of water-soluble material above said inlet in a position such that the flow of incoming water will impinge upon the lower end of the stick, a water outlet opening in the upper portion of said casing, control means mounted within said casing, said control means including a valve member for controlling flow through said outlet and means extending downwardly in said casing and adapted to engage a stick of water-soluble material within said casing, said downwardly extending means when in engagement with a relatively unused stick of water-soluble material acting to hold said valve member in an open position and acting to close said valve when said stick of water-soluble material has been substantially dissolved, and drain means for said casing, said drain means including drain valve means responsive to water pressure in said water inlet to close said drain valve means and responsive to a reduction of pressure in said water inlet to open said drain valve means to provide a drain for the water within said casing when the water flow therethrough has terminated.

3. A proportioning device for the addition of a water-soluble material to water in flow comprising a casing adapted to receive a stick of water-soluble material, a water inlet opening positioned substantially centrally of the bottom of said casing, a water outlet opening in the upper portion of said casing, a two armed lever fulcrumed within the upper portion of said casing, a valve member for controlling flow through said outlet opening carried by one arm of said lever, and a rod member extending downwardly toward the bottom of said casing carried by the other arm of said lever, said rod member upon engagement with a stick of water-soluble material within said casing acting through said two armed lever to position said valve member in an open position, and said rod member when released from engagement with the stick as a result of dissolution of the stick acting through said lever to close said valve member.

4. A proportioning device for the addition of a water-soluble material to water in flow comprising a casing adapted to receive a stick of water-soluble material, a water inlet opening positioned substantially centrally of the bottom of said casing, means within said casing for supporting a stick of water-soluble material above said inlet in a position such that the flow of incoming water will impinge upon the lower end of the stick, a water outlet opening in the upper portion of sai dcasing, a two armed lever fulcrumed within the upper portion of said casing, a valve member for controlling flow through said outlet opening carried by one arm of said lever, and a rod member extending downwardly toward the bottom of said casing carried by the other arm of said lever, said rod member upon engagement with a stick of water-soluble material within said casing acting through said two armed lever to position said valve member in an open position, and said rod member when released from engagement with the stick as a result of the stick having become substantially shortened by dissolution of the end thereof acting through said lever to close said valve member.

5. A proportioning device for the addition of water-soluble material to water in flow comprising a casing open at its top, an inlet opening positioned substantially centrally of the bottom of said casing, a lateral outlet opening positioned adjacent to the open top of said casing, a stick of water-soluble material contained within said casing, a cover for said casing, control means fulcrumed from said cover, said control means including a valve member for controlling flow through said outlet and means extending downwardly in said casing, said downwardly extending means being constructed and arranged to engage said stick of water-soluble material, and when in engagement therewith to hold said valve member in an open position and when freed therefrom as a result of dissolution of the stick to close said valve.

6. A proportioning device for the addition of a water-solube material to water in flow comprising a casing, a water inlet opening positioned substantially centrally of the bottom of said casing, means within said casing for supporting a stick of water-soluble material above said inlet in a position such that the flow of incoming water will impinge upon the lower end of the stick, a water outlet opening in the upper portion of said casing, valve means for controlling flow through said outlet opening, and means controlling said valve means, said controlling means including a member in engagement with the stick holding said valve in an open position, and said member being constructed and arranged to be released by the stick and to close said valve when the stick is substantially reduced in length by dissolution of the end thereof as a result of the water impingement thereon.

7. A proportioning device for the addition of a water-soluble material to water in flow comprising a casing, a water inlet opening positioned substantially centrally of the bottom of said casing, means within said casing for supporting a stick of water-soluble material above said inlet in a position such that the flow of incoming water will impinge upon the lower end of the stick, a water outlet opening in the upper portion of said casing, valve means for controlling flow through said outlet opening, and means controlling said valve means, said controlling means including a member in engagement with the stick holding said valve in an open position, and said member being constructed and arranged to be released by the stick and to close said valve when the stick is substantially reduced in length by dissolution of the end thereof as a result of the water impingement thereon, and drain means for said casing, said drain means including drain valve means responsive to water pressure in said water inlet to close said drain valve means and responsive to a reduction of pressure in said water inlet to open said drain valve means to provide a drain for the water within said casing when the water flow therethrough has terminated.

GEORGE A. MAU.

REFERENCES CITED

The following references are of record in the file of this patent:

UNITED STATES PATENTS

| Number | Name | Date |
|---|---|---|
| 577,121 | Stock et al. | Feb. 16, 1897 |
| 881,076 | Howard | Mar. 3, 1908 |
| 1,931,527 | Burkett et al. | Oct. 24, 1933 |
| 2,135,969 | Donaldson | Nov. 28, 1938 |